United States Patent Office 2,977,063
Patented Mar. 28, 1961

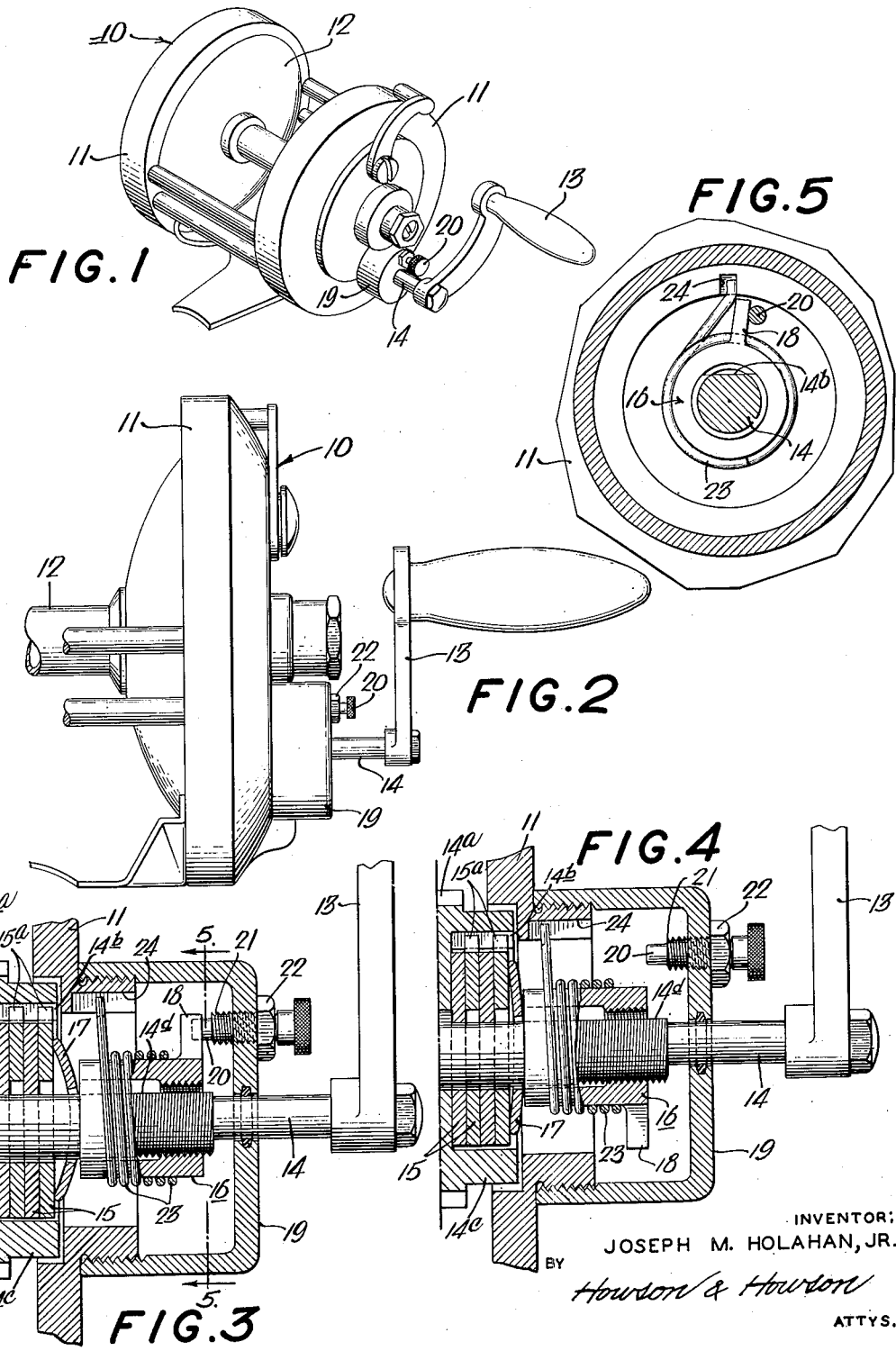

2,977,063
FISHING REEL DRAG MECHANISM

Joseph M. Holahan, Jr., Abington, Pa., assignor to True Temper Corporation, a corporation of Ohio Filed Dec. 10, 1957, Ser. No. 701,853

3 Claims. (Cl. 242—84.54)

The present invention relates to new and useful improvements in drags for fishing reels and more particularly to modifications in the fishing reel drag mechanism whereby the user of the reel may control the amount of drag by movement of the winding handle and regulate the drag range by a simple mechanical adjustment.

In prior drag actuating mechanisms of this type in order to deviate from the original drag range setting, the control mechanism had to be partially disassembled. A mechanism wherein range can be changed instantaneously is desirable and essential for a number of reasons, the most important being to compensate for the variation in effective drag that takes place during the course of use which in turn is due to the continual wear or attrition of the friction surfaces of the drag washers. A completely practical reel should embody mechanism which provides readily adjustable means to offset this inherent limitation of the drag mechanism.

The present invention besides providing a new and useful means for actuating the drag mechanism furnishes another equally important and useful feature namely a means for regulating drag range by any minute increment by simple adjustment of a mechanical device.

With the foregoing in mind, the principal object of the present invention is to provide a drag mechanism wherein the drag range can be regulated by any desired amount by adjustment of a simple mechanical device.

Another object of the present invention is to provide a novel device for actuating the drag mechanism wherein rotation of the winding handle in one direction causes pressure to be exerted axially inward on the drag washers thereby increasing drag on the spool and rotation of the winding handle in the opposite direction decreases the drag exerted on the spool.

A further object of the present invention is to furnish a novel drag mechanism which may be manufactured easily and economically and can efficiently and effectively be adapted to presently existing fishing reels.

These and other objects of the present invention and the various features and details of the operation and construction thereof are hereinafter more fully set forth and described with reference to the accompanying drawings, in which:

Fig. 1 is a perspective view of a fishing reel embodying the present invention;

Fig. 2 is a fragmentary elevational view of the drive side of the reel illustrated in Fig. 1;

Fig. 3 is an enlarged fragmentary longitudinal sectional view of the drag mechanism of the present invention showing the position of minimum drag on the spool of the reel;

Fig. 4 is an enlarged sectional view similar to Fig. 3 portraying the position of maximum drag on the spool of the reel; and Fig. 5 is a transverse sectional view taken along line 5—5 of Fig. 3.

Referring more specifically to the drawings and particularly Figs. 1 and 2 thereof, reference numeral 10 designates generally a fishing reel, comprising a pair of side plates 11, 11, a spool 12 and a handle 13 for causing rotation of the spool 12 and also for actuating the drag mechanism. The drag mechanism, which is of conventional construction, is best illustrated in Figs. 3 and 4 and includes a gear sleeve 14 rotatably journaled in one side plate of the reel. The gear sleeve 14 in turn rotatably mounts a gear 14a on the inner end thereof and the handle 13 is carried by the outer end thereof. The gear 14a is drivably connected to the spool in the conventional manner. A series of drag washers 15 are positioned about the gear sleeve 14 with alternate washers held against rotation relative to the gear by means of tangs 15a extending into a slot 14b formed in an annular sleeve 14c secured to the gear, while the remaining drag washers are held against rotation relative to the gear sleeve, for example, by engagement with a flat face 14d on the gear sleeve 14. Upon the exertion of pressure axially inward upon the drag washers, a drag is exerted on the spool 12.

In accordance with the present invention means are provided to affect an increase in drag upon rotation of the winding handle 13 in a direction for winding line on the spool and to cause a decrease in drag upon rotation of the handle in the opposite direction. To accomplish this, a collar member 16, carried by the gear sleeve, is adapted to be moved into pressure applying relationship with the drag washers by way of a spring washer 17 mounted intermediate said drag washers 15 and collar 16 upon rotary movement of the handle 13. In the present embodiment the collar 16 is threadedly connected to the outer end of the gear sleeve 14 and has a lug 18 formed on its outer surface. To effect axial movement of the collar 16 with respect to the gear sleeve means are provided to restrain rotary movement of the collar upon rotary movement of the gear sleeve in a clockwise direction as viewed from Figs. 1 and 5. Accordingly, a cup member 19, having an adjustable stop member 20 interconnected therewith is positioned about the gear sleeve 14. The interaction of the stop member 20 and the lug 18 prevents rotary movement of the collar 16 with the gear sleeve 14 and causes axial movement of the collar upon clockwise rotation of the handle 13. The cup member 19 is mounted on the side plate of the housing coaxially with the gear sleeve 14 and may be secured to the side plate by means of a threaded connection. The cup 19 is suitably mounted on the side plate so that it is maintained stationary during use of the reel. The stop member 20, carried by the cup member, projects inwardly toward the side plate of the reel in the path of the lug and may be an adjustable screw member 21 so that lateral movement of said screw with respect to the cup may be employed to provide an adjustment in the drag range as set forth in detail hereinafter. The screw member is held in a fixed position after having been set by means of a lock nut 22. Thus, in accordance with the construction described, as the handle 13 is rotated in the clockwise direction which is also the direction for winding line on to the spool, the collar 16 is moved inwardly along the gear sleeve due to the interaction of the lug 18 with the stop member, thereby increasing the pressure exerted on the drag washers 15. The stop member 20 prevents rotation of the collar with the gear sleeve until the gear sleeve has moved inwardly to a position, as shown in Fig. 4, out of engagement with the member 20.

Additionally, means are provided to decrease drag on the spool of the reel. Accordingly, a constricting member, associated with the collar 16, is adapted to induce axial movement of the collar 16 outwardly along the gear sleeve 14 and decrease drag on the spool upon rotary movement of the handle 13 in a direction opposite the direction for winding line on the spool. The constricting member may be a coil spring 23 which is wound about the collar having an outer end which lies in the orbit of the other coils, lies within the confines of the convolutions of the coil, and an inner end which protrudes tangentially from the other coils, i.e. protrudes outwardly of said convolutions, and is received in a keyway 24 located on the inner wall of the side plate, as shown in Fig. 5. A cylindrical helical spring of circular cross section is preferably used in the present invention having clockwise convolutions as viewed from the outer end of the collar with respect to Fig. 5 so that rotary movement of the collar in a clockwise direction to increase drag as induced by similar movement of the handle 13 causes the spring coils to loosen their constrictive grip on the collar 16 thereby permitting relative free movement of the collar 16 within the spring. Rotation of the handle 13 in a counterclockwise direction tends to cause the spring to be wound more tightly about the collar 16, that is, the convolutions tend to contract radially to thereby exert a force on the peripheral surface of the collar and restrict movement of the collar with respect to the spring 23. Thus, when the handle 13 is rotated in the clockwise direction the movement of the collar 16 axially inward along the gear sleeve 14 is controlled solely by the stop member 20. Conversely, when the handle is rotated in the opposite direction the axial movement of the collar 16 outwardly, resulting in a decreased pressure on the drag washers, is regulated by the action of the coil spring 23.

In operation, therefore, as the handle 13 is rotated in a direction to rotate the spool, the collar 16 is moved inwardly along the gear sleeve 14 and exerts pressure on the drag washers 15 to thereby apply the desired amount of drag on the spool. The interaction of the stop member 20 and the collar 16 defines the movement of the collar relative to the gear sleeve 14 and limits the amount drag can be increased on the spool. When the handle 13 is rotated in the clockwise direction relative to Fig. 1 which is also the direction of rotation for winding the spool, the collar 16 is rotated with the gear sleeve 14 to a position wherein the lug 18 of the collar initially engages the stop member 20 thereby preventing further rotary movement of the collar with the gear sleeve. Upon further rotation of the handle 13 and gear sleeve 14 the interference of the lug 18 with the stop member causes the collar 16 to move inwardly along the gear sleeve thereby applying pressure on the drag washers and increasing drag on the spool 12, until the lug 18 advances to a position beyond the inner end of the stop member 20. The collar 16 then moves within the coil spring with the gear sleeve. As the handle 13 is rotated in the opposite direction the convolutions of the spring have a tendency to tighten and grip the collar 14 with a pressure radially inward along the outer surface of the collar, preventing rotary movement of the collar in the counterclockwise direction and causing the collar to move outward along the gear sleeve thereby decreasing the pressure exerted axially inward on the drag washers.

Another feature of the present invention is the provision of means for varying the drag range. This is done by regulating the adjustable screw member 21 carried by the face of the cup member 20 extending inwardly into the path of travel of the lug as shown in Fig. 3. Movement of the screw 21 relative to the cup is instrumental in changing the drag range with respect to maximum drag only for a particular setting since the extreme minimum drag position is defined independently of the screw member, being limited to the amount of outward travel of the collar along the gear sleeve as motivated by the constricting action of the coil spring upon rotation of the winding handle. Thus, in order to increase the maximum drag for a particular range setting, the adjustable screw member 21 is rotated to advance the screw toward the side plate. As a result of said movement an increased travel of the collar along the gear sleeve is necessitated before the lug disengages the screw member. The pressure exerted by the collar is thereby increased by an amount directly proportionate to the advance of the screw member.

To use a reel embodying the drag mechanism of the present invention, after a fish is hooked, the handle 13 may be rotated, for example, to the position shown in Fig. 4 which is the position of maximum drag for the setting to reel in the fish. If the drag at this point is insufficient to land the fish drag can be increased by advancing the adjustable screw 21, thereby increasing the distance the collar must advance inwardly along the gear sleeve 14 before the lug formed on the collar disengages the screw 21 and increasing the force axially inward on the drag washers. However, if the fish starts to pull on the line and the fisherman desires to play the fish, drag may be decreased by a counterclockwise rotation of the handle.

From the foregoing it will be apparent that the present invention provides a novel improvement in drag mechanism for fishing reels wherein the drag on the line may be varied by movement of the winding handle which in turn actuates a collar and associated items to provide a range adjustable to any maximum or minimum drag. In addition, it will be apparent that the invention provides a novel improvement in a drag mechanism which is of relatively simplified construction, is easy to use and may be manufactured easily and cheaply.

While a particular embodiment of the present invention has been illustrated and described herein, it is not intended to limit the invention to such a disclosure and changes and modifications may be incorporated and embodied therein within the scope of the following claims.

I claim:

1. In a fishing reel having a pair of end plates rotatably mounting therebetween a spool, a gear sleeve drivably connected to the spool and operable to cause rotation of the spool, and pressure actuated drag mechanism positioned about the gear sleeve and operable to exert a drag on the spool upon application of pressure on the drag mechanism in a direction axially inward of the gear sleeve, the improvement comprising; a handle member connected to the gear sleeve operable to cause rotation of said gear sleeve and actuation of the drag mechanism, a cup carried by an end plate and positioned about the gear sleeve, adjustable stop means mounted on the face of said cup, a collar threaded on the gear sleeve for axial movement therealong between inner and outer limit positions, said collar being operable upon rotation of the gear sleeve relative to said collar in one direction to be moved toward the inner limit position to increase pressure on the drag mechanism to thereby increase drag on the spool, a lug formed on the collar and engageable with the stop means to cause movement of the collar along the gear sleeve from the outer limit position to the inner limit position upon rotation of the gear sleeve in said one direction, the lug disengaging the stop means at said inner limit position whereby the collar is rotatable with the gear sleeve, and means interconnected with the collar operable to engage the collar to prevent rotation of said collar and cause movement of the collar axially of the gear sleeve toward the outer limit position upon rotation of the gear sleeve in the other direction.

2. In a fishing reel having a pair of end plates rotatably mounting therebetween a spool, a gear sleeve drivably connected to the spool and operable to cause rotation of the spool, and pressure actuated drag mechanism positioned about the gear sleeve and operable to exert a drag on the spool upon application of pressure on the drag mechanism in a direction axially inward of the gear sleeve, the improvement comprising; a handle member connected to the gear sleeve operable to cause rotation of said gear sleeve and actuation of the drag mechanism, a collar threaded on the gear sleeve for axial movement therealong between inner and outer limit positions, means for causing rotation of the gear sleeve relative to said collar when said gear sleeve is rotated in one direction whereby said collar is moved toward the inner limit position to increase pressure on the drag mechanism to thereby increase drag on the spool, means providing a keyway in one of said end plates, and a coil spring having convolutions wound about the collar with one end of said spring lying radially within the confines of the convolutions and the other end thereof extending outwardly of said convolutions and projecting into said keyway, the convolutions of said coil spring being in engagement with said collar and operable to grip said collar to prevent rotation thereof and cause movement of said collar axially of the gear sleeve toward the outer limit position upon rotation of the gear sleeve in the other direction.

3. In a fishing reel having a pair of end plates rotatably mounting therebetween a spool, a gear sleeve drivably connected to the spool and operable to cause rotation of the spool, and pressure actuated drag mechanism positioned about the gear sleeve and operable to exert a drag on the spool upon application of pressure on the drag mechanism in a direction axially inward of the gear sleeve, the improvement comprising; a handle member connected to the gear sleeve operable to cause rotation of said gear sleeve and actuation of the drag mechanism, a cup carried by one of said end plates and positioned about the gear sleeve, adjustable stop means mounted on the face of said cup, a collar threaded on the gear sleeve for axial movement therealong between inner and outer limit positions, said collar being operable upon rotation of the gear sleeve relative to said collar in direction to be moved toward the inner limit to increase pressure on the drag mechanism to thereby increase drag on the spool, a lug formed on the collar and engageable with the stop means to cause movement of the the collar along the gear sleeve from the outer limit position to the inner limit position upon rotation of the gear sleeve in said one direction, the lug disengaging the stop means at said inner limit position whereby the collar is rotatable with the gear sleeve, means providing a keyway in said one of said end plates, and a coil spring having convolutions wound about the collar with one end of the spring lying radially within the confines of the convolutions and the other end thereof extending outwardly of said convolutions and projecting into said keyway, the convolutions of said coil spring being in engagement with said collar and operable to grip said collar to prevent rotation thereof and cause movement of said collar axially of the gear sleeve toward the outer limit position upon rotation of the gear sleeve in the other direction.

References Cited in the file of this patent
UNITED STATES PATENTS

| | | |
|---|---|---|
| 1,981,429 | Scott | Nov. 20, 1934 |
| 2,760,736 | Mihalko et al. | Aug. 28, 1956 |